(12) United States Patent
Kim et al.

(10) Patent No.: US 11,630,527 B2
(45) Date of Patent: Apr. 18, 2023

(54) INPUT DEVICE AND ELECTRONIC DEVICE INTERACTING WITH INPUT DEVICE

(71) Applicant: Samsung Electronics Co., Ltd., Gyeonggi-do (KR)

(72) Inventors: Minjun Kim, Gyeonggi-do (KR); Duckwon Yoon, Gyeonggi-do (KR); Moonkyou Kim, Gyeonggi-do (KR); Taegun Kim, Gyeonggi-do (KR); Byungku Park, Gyeonggi-do (KR); Minchul Sung, Gyeonggi-do (KR); Yeungjin Yeu, Gyeonggi-do (KR); Sunghwan Cho, Gyeonggi-do (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 17/483,951

(22) Filed: Sep. 24, 2021

(65) Prior Publication Data
US 2022/0011888 A1 Jan. 13, 2022

Related U.S. Application Data

(63) Continuation of application No. PCT/KR2020/004015, filed on Mar. 24, 2020.

(30) Foreign Application Priority Data

Mar. 26, 2019 (KR) .................... 10-2019-0034053

(51) Int. Cl.
*G06F 3/0354* (2013.01)
*G06F 3/0346* (2013.01)
(Continued)

(52) U.S. Cl.
CPC .......... *G06F 3/03547* (2013.01); *G06F 3/038* (2013.01); *G06F 3/0346* (2013.01); *G06F 3/0362* (2013.01)

(58) Field of Classification Search
CPC .. G06F 3/03547; G06F 3/0346; G06F 3/0362; G06F 3/038
See application file for complete search history.

(56) References Cited

U.S. PATENT DOCUMENTS

| 8,933,881 | B2 | 1/2015 | Kim et al. |
| 11,209,919 | B1* | 12/2021 | Lin ........................ G06F 3/0393 |

(Continued)

FOREIGN PATENT DOCUMENTS

| KR | 10-2007-0096547 A | 10/2007 |
| KR | 10-1065921 B1 | 9/2011 |

(Continued)

*Primary Examiner* — Ariel A Balaoing
(74) *Attorney, Agent, or Firm* — Cha & Reiter, LLC

(57) ABSTRACT

According certain embodiments of the disclosure, an input device comprises: a touch pad exposed through a first surface of the input device; a sensor circuit configured to sense a movement of the input device; a communication circuit configured to communicate with an external device; and a processor connected to the touch pad, the sensor circuit and the communication circuit, wherein the processor is configured to: when the sensor circuit detects movement of the input device satisfies a specified condition, prompt a user to enter predetermined inputs indicating a reference direction, receive actual user inputs indicating a first direction, and determine the first direction based on the actual user inputs; when a touch input on the touch pad is detected by using the touch pad, determine touch coordinate information for the touch input based on an angle between the reference direction on the touch pad and the first direction; and send the touch coordinate information to the external device through the communication circuit.

14 Claims, 15 Drawing Sheets

(51) Int. Cl.
  *G06F 3/0362* (2013.01)
  *G06F 3/038* (2013.01)

(56) References Cited

U.S. PATENT DOCUMENTS

| | | | |
|---|---|---|---|
| 2004/0253931 A1* | 12/2004 | Bonnelykke | G06F 3/033 |
| | | | 455/90.3 |
| 2008/0068336 A1 | 3/2008 | Choi et al. | |
| 2008/0235247 A1* | 9/2008 | Krantz | G06F 3/0485 |
| 2009/0299686 A1* | 12/2009 | Ho | G06F 3/038 |
| | | | 702/151 |
| 2013/0002576 A1 | 1/2013 | Kim et al. | |
| 2015/0168726 A1* | 6/2015 | Kimura | G06F 3/03547 |
| | | | 345/156 |
| 2015/0331511 A1 | 11/2015 | Jeong et al. | |
| 2016/0085321 A1* | 3/2016 | Jung | G06F 3/0383 |
| | | | 345/184 |
| 2016/0320939 A1* | 11/2016 | Min | B60K 35/00 |
| 2018/0011556 A1* | 1/2018 | Minyu | G06F 3/016 |
| 2019/0012003 A1* | 1/2019 | Grant | G06F 3/0312 |
| 2019/0113985 A1* | 4/2019 | Sawada | G06F 3/038 |

FOREIGN PATENT DOCUMENTS

| | | | |
|---|---|---|---|
| KR | 10-2015-0137827 A | 12/2015 |
| KR | 10-1788006 B1 | 10/2017 |
| KR | 10-2018-0031620 A | 3/2018 |
| KR | 10-2018-0060541 A | 6/2018 |
| KR | 10-1875181 B1 | 7/2018 |

\* cited by examiner

INPUT DEVICE AND ELECTRONIC DEVICE INTERACTING WITH INPUT DEVICE

CROSS-REFERENCE TO RELATED APPLICATION(S)

This application is continuation of International Application No. PCT/KR2020/004015, filed on Mar. 24, 2020, which claims priority to Korean Patent Application No. 10-2019-0034053 filed on Mar. 26, 2019 in the Korean Intellectual Property Office, the disclosures of which are herein incorporated by reference.

TECHNICAL FIELD

Embodiments of the disclosure relate to a technology for implementing an input device.

BACKGROUND ART

A computing device (e.g., a notebook) may include various input devices such as an advanced input device (e.g., a touch pad), as well as a basic input device (e.g., a keyboard). One type of input device includes a wheel key and is capable of providing rotation input information (e.g., a rotation direction and a rotation angle) of the wheel key. The computing device may adjust a color or a picture size, based on the rotation input information. Alternatively, the computing device may control a sound level, based on the received rotation information.

DISCLOSURE

Technical Problem

The rotation input devices do not provide a pointing function separately from rotation information. Accordingly, a user has the inconvenience of using a pointing means (e.g., a mouse) for pointing of a computing device independently of the rotation input device.

Certain embodiments of the disclosure may provide an input device capable of controlling a movement of a pointer object so as to correspond to a touch direction of a user even where the input device moves, and an electronic device interacting with the input device.

Technical Solution

According to an embodiment of the disclosure, an input device may include a touch pad that is exposed through a first surface of the input device, a sensor circuit that senses a movement of the input device, a communication circuit that communicates with an external device, and a processor, and the processor may guide to determine a first direction when that the movement of the input device meets a specified condition is detected by using the sensor circuit, may determine, when a touch input on the touch pad is detected by using the touch pad, touch coordinate information corresponding to the touch input based on an angle between a reference direction on the touch pad and the first direction, and may send the touch coordinate information to the external device through the communication circuit.

According to an embodiment of the disclosure, an input device comprises: a touch pad exposed through a first surface of the input device; a sensor circuit configured to sense a movement of the input device; a communication circuit configured to communicate with an external device; and a processor connected to the touch pad, the sensor circuit and the communication circuit, wherein the processor is configured to: when the sensor circuit detects movement of the input device satisfies a specified condition, prompt a user to enter predetermined inputs indicating a reference direction, receive actual user inputs indicating a first direction, and determine the first direction based on the actual user inputs; when a touch input on the touch pad is detected by using the touch pad, determine touch coordinate information for the touch input based on an angle between the reference direction on the touch pad and the first direction; and send the touch coordinate information to the external device through the communication circuit.

According to an embodiment of the disclosure, an electronic device may include a communication circuit that communicates with an input device, a display, and a processor connected to the display and the communication circuit, and the processor may display a pointer object by using the display, may receive touch coordinate information of a touch pad included in the input device and movement-related information of the input device from the input device through the communication circuit, may check an angle between a reference direction on the touch pad and a first direction of the display when that a movement of the input device meets a specified condition is checked based on the movement-related information, may correct the received touch coordinate information based on the checked angle, and may move the pointer object based on the corrected touch input information.

According to embodiments of the disclosure, even though the coordinate system of a touch pad and the coordinate system of an electronic device are not matched due to a movement of an input device, it may be possible to control a movement of a pointer object so as to correspond to a touch direction of a user. Besides, a variety of effects directly or indirectly understood through this disclosure may be provided.

With regard to description of drawings, the same or similar components will be marked by the same or similar reference signs.

MODE FOR INVENTION

Figure 1:
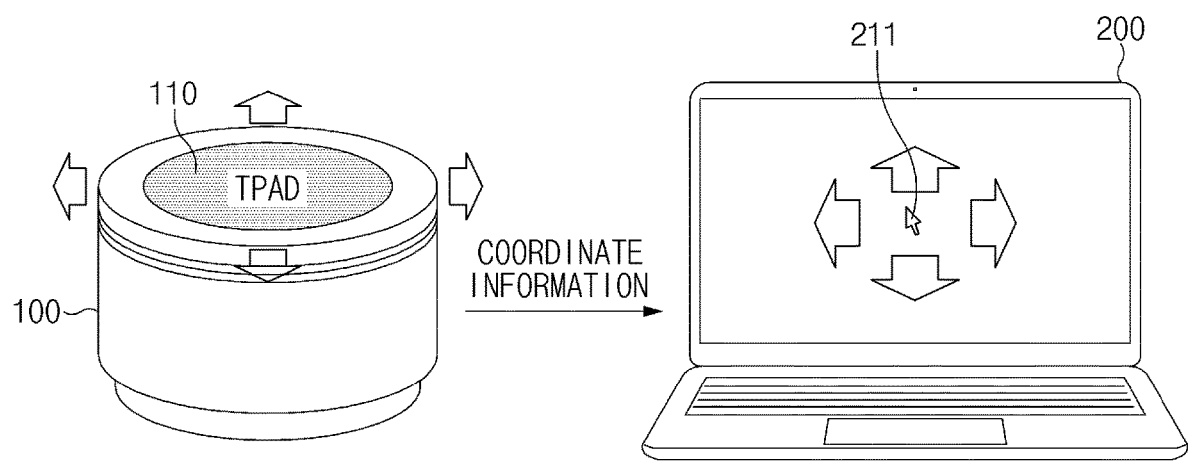
FIGS. 1 and 2 illustrate an operating environment of an input device according to an embodiment.
Figure 2:
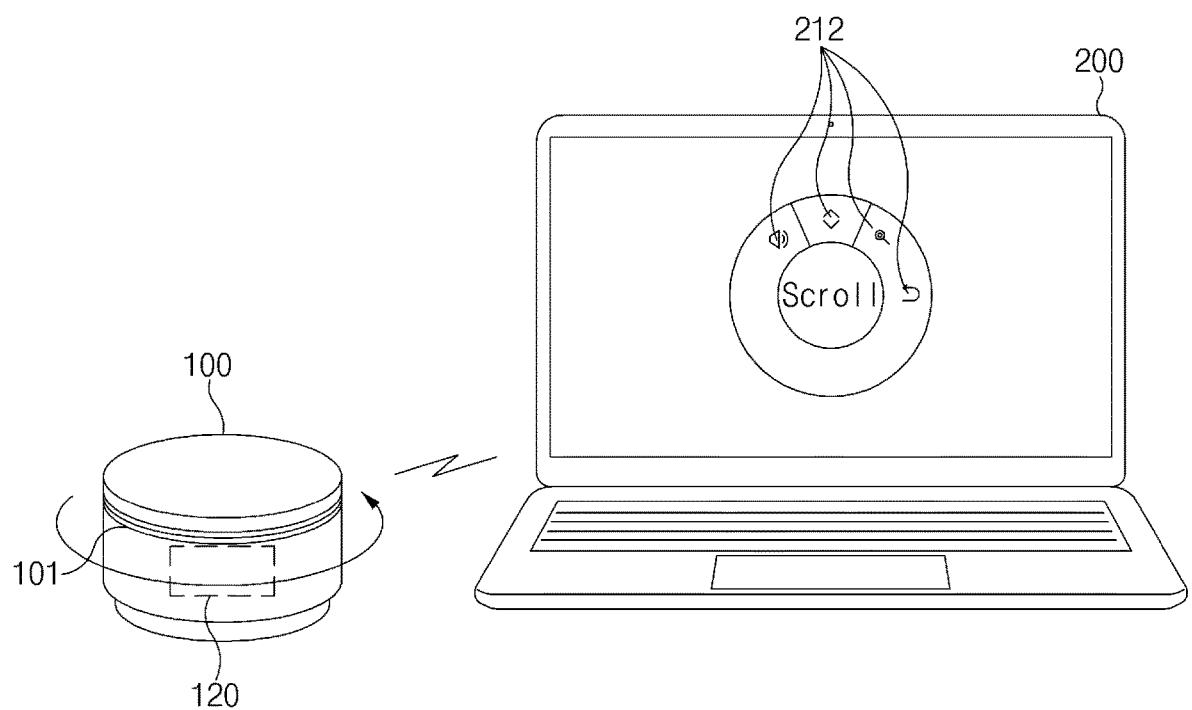

FIGS. 1 and 2 illustrate an operating environment of an input device according to an embodiment.

FIG. 1 shows an input device 100. A touch pad 110 of the input device may correspond to a coordinate system which in turn can correspond to the screen of a computing device 200. However, where the input device 100 is rotated, an apparent x or y direction of the touch pad 110 may not correspond to the x or y direction in the coordinate system. Moreover, the input received by the computing device 200 may be erroneous. That is, a user movement from the left to the right would appear to correspond to the x axis. However, when the device is turned +a degrees in the counterclockwise direction, a user input from the left to the right would actually correspond to a direction of −a degrees in the coordinates system.

To fix this, when the input device 100 is moved equal to or in excess of a specified magnitude, as detected by a sensor, the input device 100 prompts the user. The input device 100 prompts the user to provide inputs indicating a reference direction. For example, the input device 100 may make a voice request to "drag finger from left to right." In the foregoing case, "left to right" or +x axis is the reference direction. The actual inputs received from the user will indicate a first direction. For example, if the input device 100 is rotated +a degrees in the counterclockwise direction, the actual user inputs will indicate a first direction that is −a degrees in the coordinate system of the input device 100. Accordingly, the attitude angle of the input device 100 can be deemed the angle between the reference direction and the first direction. Moreover, the input device 100 can then correct subsequent directional inputs by adding/subtracting the attitude angle to the angle of the coordinate system.

Referring to FIG. 1, an input device 100 according to an embodiment may be provided to sense a touch input of a user. For example, the input device 100 may include a touch pad 110 exposed to the outside through a first surface (e.g., an upper surface). The touch pad 110 may sense a touch input, thereon. The input device 100 may send coordinate information about the sensed touch input to a computing device 200.

According to an embodiment, the computing device 200 may provide a pointing function based on the coordinate information received from the input device 100. For example, the computing device 200 may move and display a pointer object 211. The pointer object 211 may correspond to the coordinates of the touch input.

Referring to FIG. 2, the input device 100 may receive a rotation input. For example, the exterior of the input device 100 may be in the shape of a cylinder, and a wheel key 101 that rotates depending on an operation of a user. The wheel key 101 may be installed to surround a side surface of the input device 100. The input device 100 may include a sensor circuit 120 (e.g., a light sensor and/or a hole sensor) capable of sensing a rotation of the wheel key 101. The sensor circuit 120 may detect a rotation of the wheel key 101. The input device 100 may send information (e.g., rotation direction information and rotation angle information) about the detected rotation input to the computing device 200.

The input device 100 may provide the information to the computing device 200 using either wireless communication or wired communication. For example, the input device 100 may be connected to the computing device 200 with a USB cable. In other embodiments, the input device 100 may transmit a signal using short-range wireless communication, such as BlueTooth, or WiFi P2P to name a few.

The computing device 200 may receive the rotation input information from the input device 100 and may provide a function based on the rotation input information. The function can be of an application program that is being executed on the computing device 200. For example, when the computing device 200 connects with the input device 100 for communication, the computing device 200 may display a function list 212 capable of being provided through the input device 100 and may provide a function selected from the function list 212 based on the rotation input information. The computing device 200 may adjust, for example, a drawing color or a picture size in conjunction with an application providing an illustration function, based on the rotation input information.

The touch pad 110 may be rotated while the input device 100 is operated by the user. For example, the user may manually turn the input device 100 approximately 180 degrees. In this case, the input device 100 may not properly sense a touch input of the user. For example, even though the user performs a drag input facing from the left to the right, the input device 100 may detect the drag input as a drag input facing from the right to the left. The reference direction may be, for example, an x-axis or y-axis direction on the absolute coordinate system of the touch pad 110 of the input device 100.

To prevent the above issue, according to an embodiment, the input device 100 may correct touch coordinate information of a touch input detected through the touch pad 110. For example, the input device 100 may include a sensor circuit (e.g., a gyro sensor, an acceleration sensor, or a proximity sensor) for sensing a movement of the input device 100. The sensor circuit may detect a movement of the input device 100. When an amount or magnitude of the movement of the input device 100 is greater than or equal to a specified magnitude, the input device 100 may guide the user to perform touch inputs in a plurality of directions.

When the touch inputs in the plurality of directions by the user are obtained, the input device 100 may detect a first direction (e.g., the x-axis direction) based on the touch inputs in the plurality of directions. The input device 100 may correct touch coordinate information according to the touch inputs based on an angle (e.g., an attitude angle of the input device 100) between the reference direction on the touch pad 110 and the first direction (manual correction function for touch coordinates). In certain embodiments, the input device 100 may add or subtract the angle between the reference direction and the first direction. For another example, the input device 100 may include a sensor circuit (e.g., a geomagnetic sensor) capable of sensing a first direction of the outside of the input device 100. The input device 100 may detect the first direction by using the sensor circuit and may correct touch coordinate information (e.g., touch coordinates) according to the touch inputs based on an angle between the reference direction on the touch pad 110 and the first direction (manual correction function for touch coordinates). In certain embodiments, the input device 100 may send movement-related information to the computing device 200. The movement-related information may include, for example, at least one of the attitude angle of the input device 100 or movement magnitude information of the input device 100.

According to certain embodiments, at least part of a configuration of the input device 100 may be controlled by the computing device 200. For example, the input device 100 may send at least one of the movement-related information, the touch coordinate information, and the rotation input information to the computing device 200. In this case, the computing device 200 may determine correction data capable of correcting the coordinate information about the received touch input based on the movement-related information and may provide a pointing function in response to the touch coordinate information of the input device 100 based on the correction data.

Figure 3:
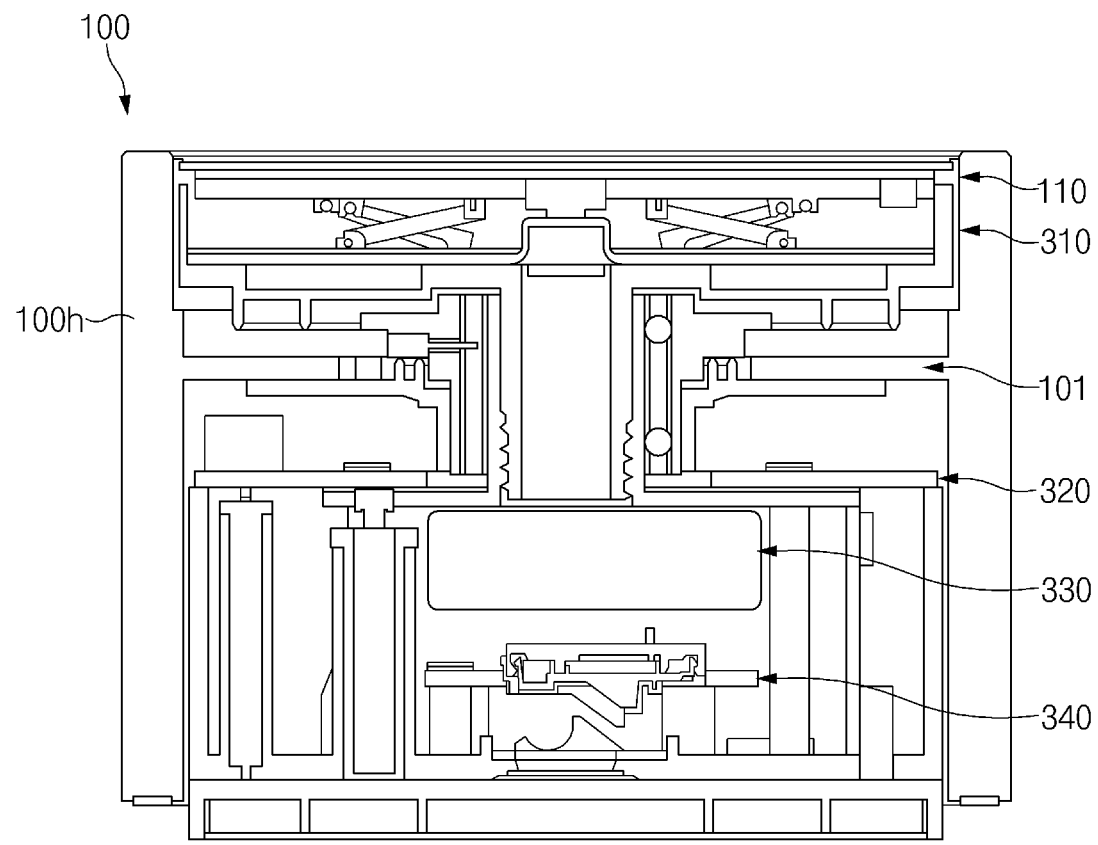
FIG. 3 illustrates a cross-sectional view of an input device according to an embodiment.

FIG. 3 illustrates a cross-sectional view of an input device according to an embodiment.

Referring to FIG. 3, the touch pad 110 (e.g., the touch pad 110 of FIG. 1) may be exposed on the first surface of the input device 100 (e.g., the input device 100 of FIG. 1) according to an embodiment. Also, a sensor circuit (e.g., a pressure sensor) 310 capable of sensing a click on the touch pad 110 may be included under the touch pad 110. The wheel key 101 may be exposed on at least a portion of the side surface of the input device 100, thereby allowing the wheel key 101 to sense a rotation operation of the user. The side surface may be provided to surround a space between the first surface and a second surface of the input device 100. A sensor circuit (e.g., a light-emitting element and a photo detector) 340 for a mouse function may be exposed on a bottom surface of the input device 100 so as to emit a light and to sense a received light. A battery 330 supplying a power to circuit elements of the input device 100, a printed circuit board 320 on which the circuit elements are mounted, circuitries such as a processor controlling the circuit elements may be embedded between the first surface and the second surface of the input device 100. The input device 100 may include a cover 100*h*. For example, the cover 100*h* may be disposed outside the input device 100. The cover 100*h* may allow the touch pad 110, the wheel key 101, and the sensor circuit 340 to be coupled to the input device 100. Also, the cover 100*h* may allow the sensor circuit 310, the printed circuit board 320, and the battery 330 to be disposed within the input device 100.

Figure 4:
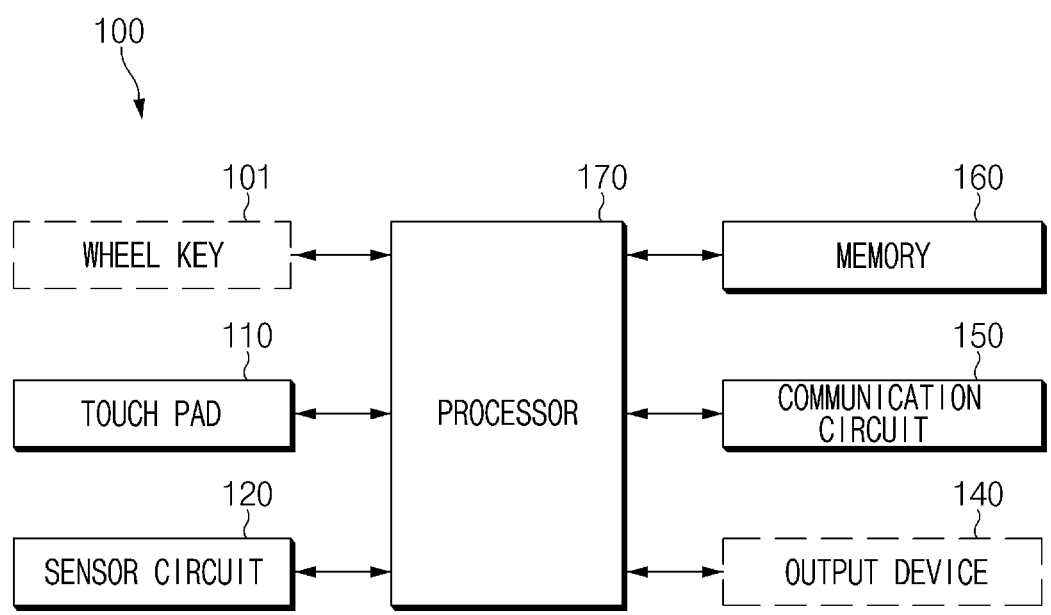
FIG. 4 illustrates a configuration diagram of an input device according to an embodiment.

FIG. 4 illustrates a configuration diagram of an input device according to an embodiment.

Referring to FIG. 4, the input device 100 according to an embodiment may include the touch pad 110, the sensor circuit 120, a communication circuit 150, a memory 160, and a processor 170. In an embodiment, the input device 100 may not include some of the above components or may further include any other component(s). For example, the input device 100 may further include the wheel key 101 and an output device 140. In an embodiment, some of the components of the input device 100 may be combined to form one entity, which may identically perform functions of the corresponding components before the combination.

As used herein, the term "processor" shall be understood to refer to both the singular and plural contexts.

According to an embodiment, the wheel key 101 may be installed, for example, in at least a portion of the side surface of the input device 100 and may rotate depending on an operation of the user.

According to an embodiment, the touch pad 110 may be exposed to the outside through the first surface (e.g., an upper surface) of the input device 100. The touch pad 110 may sense a touch input and may output coordinate information about the sensed touch input.

According to an embodiment, the sensor circuit 120 may include at least one of a geomagnetic sensor, a gyro sensor, an acceleration sensor, a proximity sensor, a grip sensor, a light sensor, or a hole sensor. The geomagnetic sensor may sense a first direction (e.g., a true (or geographic) north direction) of the outside of the input device 100. At least one of the gyro sensor or the acceleration sensor may sense a movement of the input device 100. The proximity sensor may be exposed through a lower part of the input device 100 and may sense a distance between the input device 100 and a floor on which the input device 100 is put. The grip sensor may sense a touch of the user that grips the input device 100. For example, the grip sensor may be provided at at least a portion of the side surface of the input device 100 (e.g., on a side surface or at at least a portion of an area where the side surface and the front surface thereof are connected) and may sense a user touch on the side surface of the input device 100. The light sensor and/or the hole sensor may sense a rotation direction and a rotation angle of the wheel key 101. The light sensor and/or the hole sensor may be included in the wheel key 101.

According to an embodiment, the communication circuit 150 may establish a communication channel capable of communicating with the computing device 200. For example, the communication channel may include a channel for wireless communication such as Bluetooth communication or Wi-Fi communication.

According to an embodiment, the output device 140 may include a speaker that outputs a voice signal.

For example, the memory 160 may store a command or data associated with at least one other component of the input device 100. The memory 160 may be a volatile memory (e.g., a RAM), a nonvolatile memory (e.g., a ROM or a flash memory), or a combination thereof. According to an embodiment, the memory 160 may store instructions that cause the processor 170, when that a movement of the input device 100 meets a specified condition is detected by using the sensor circuit 120, to guide to determine a first direction (e.g., an x-axis of a display of the computing device 200) of the outside of the input device 100, to detect a touch input on the touch pad by using the touch pad 110, to correct touch coordinate information (i.e., a touch coordinate value) corresponding to the touch input based on the first direction, and to send the touch coordinate information to the computing device 200 through the communication circuit 150. The memory 160 may store a coordinate value or a correction value corresponding to each of sensing nodes on the touch pad 110 based on an angle (e.g., the attitude angle of the input device 100) between the reference direction (e.g., the x-axis direction of the touch pad 110) on the touch pad 110 and the first direction (e.g., the x-axis direction of the display of the computing device 200).

The processor 170 may perform computation (or calculation) or data processing associated with a control and/or a communication of at least one other component(s) of the input device 100 by using the instructions stored in the memory 160. For example, the processor 170 may include at least one of a central processing unit (CPU), a graphics processing unit (GPU), a microprocessor, an application processor, an application specific integrated circuit (ASIC), or a field programmable gate arrays (FPGA) and may include a plurality of cores.

According to an embodiment, the processor 170 may detect a rotation direction and a rotation angle of the wheel key 101 by using the sensor circuit 120 (e.g., a light sensor and/or a hole sensor) and may generate rotation input information including the detected rotation direction and rotation angle. The processor 170 may send the rotation input information to the computing device 200 through the communication circuit 150.

According to an embodiment, the processor 170 may detect touch coordinate information corresponding to a touch input on the touch pad 110 by using the touch pad 110 and may send the detected touch coordinate information to the computing device 200 through the communication circuit 150.

According to an embodiment, the processor 170 may determine whether a movement of the input device 100 meets the specified condition, based on the information detected by using the sensor circuit 120; when the movement of the input device 100 meets the specified condition, the processor 170 may determine the first direction (e.g., the x-axis direction of the computing device 200) depending on the movement (or rotation) of the touch pad 110.

According to an embodiment, the processor 170 may detect a magnitude (e.g., an angular velocity value or an acceleration value) of the movement of the input device 100 by using the sensor circuit 120 (e.g., a gyro sensor or an acceleration sensor); when the detected movement magnitude is greater than or equal to a specified magnitude, the processor 170 may output prompts that guide user to enter a series of predetermined inputs that are used to determine a first direction. Based on the actual user inputs in response to the prompts, the input device 100 can determine the first direction. The prompts can include a voice signal (e.g., "Drag from left to right") guiding a touch input in the first direction through the output device 140. After outputting the voice signal, the processor 170 may obtain a plurality of first touch inputs on the touch pad 110. The processor 170 may determine the first direction (e.g., the x-axis direction of the computing device 200) based on the plurality of first touch inputs (e.g., a drag input facing the first direction). For example, the processor 170 may determine at least one direction from among directions detected from the plurality of first touch inputs as a second direction.

According to an embodiment, when the sensor circuit 120 detects that the input device 100 is lifted from the floor and is then lowered to the floor, the processor 170 may output a voice signal guiding a touch input in the first direction. The processor 170 may determine the first direction based on the plurality of first touch inputs.

According to an embodiment, the processor 170 may detect a touch of the user gripping the input device 100 by using the sensor circuit 120 and may determine the first direction based on at least one of a position of the user touch, the number of touches, or the touch area (manual touch coordinate correction). For example, when that the user grips the input device 100 is detected by using the sensor circuit 120, the processor 170 may determine whether the user grips the input device 100 with his/her left hand or his/her right hand, based on at least one of the position of the user touch, the number of touches, or the touch area. In this regard, the processor 170 may detect a position of a finger (e.g., a thumb or a little finger) of the user based on at least one of the position of the user touch, the number of touches, or the touch area. When it is determined that the user grips the input device 100 with his/her left hand, the processor 170 may determine, as the first direction, a direction facing from a position of the little finger of the user to a position of the thumb. In an embodiment, the examples in which the processor 170 determines the first direction may be combined with any other examples.

According to an embodiment, the processor 170 may check an angle (in this specification, referred to as an "attitude angle" of the input device 100) between the reference direction (e.g., the x-axis direction of the touch pad 110) on the touch pad 110 and the first direction (e.g., the x-axis direction of the display of the computing device 200). In certain embodiments, the input device 100 may prompt the user to provide an input indicative of the reference direction. The direction indicated by the actual user input can be considered the first direction. For example, when input device 100 may output a voice commence asking the user to move their finger from the right to the left, the reference direction is the +x axis. However, when the touch pad 110 rotates by 90 degrees, the actual user input, or first direction is −90 degrees. Accordingly, the checked attitude angle can be +90 degrees or −90 degrees.

According to an embodiment, the processor 170 may determine (e.g., correct) the touch coordinate information detected from the touch pad 110, based on the checked attitude angle. For example, when there is detected a touch coordinate value on the touch pad 110 according to a touch input of the user, the processor 170 may correct the touch coordinate value, which is detected based on the attitude angle, to a coordinate value according to the coordinate system of the computing device 200 and may determine touch coordinate information including the corrected coordinate value. An embodiment in which the processor 170 determines touch coordinate information will be described later. In an embodiment, the processor 170 may send the determined touch coordinate information to the computing device 200 through the communication circuit 150.

According to certain embodiments, the processor 170 may further check a second direction in addition to the first direction and may correct touch coordinate information based on the first and second directions. For example, after checking the first direction, the processor 170 may output a voice signal (e.g., "Drag from bottom to top") guiding a touch input in the second direction. After outputting the voice signal, the processor 170 may receive a plurality of second touch inputs on the touch pad 110 and may determine the second direction (e.g., the y-axis direction) based on the plurality of second touch inputs. For example, the processor 170 may determine an average direction of directions detected from the plurality of second touch inputs as the second direction. In this regard, the processor 170 may determine the second direction perpendicular to the first direction.

According to certain embodiments, the processor 170 may detect a third direction (e.g., a true north direction) of the outside of the input device 100 by using the sensor circuit 120 (e.g., a geomagnetic sensor) and may check an angle between the reference direction on the touch pad 110 and the first direction based on the third direction. For example, the processor 170 may check a first angle between the reference direction and the third direction in a state (e.g., an initial setting operation) where the input device 100 is put in front of the computing device 200 such that the reference direction of the touch pad 110 and the first direction of the computing device 200 are matched, and may store the first angle thus checked in the memory 160 as an initial value. Afterwards, the processor 170 may track the third direction while the input device 100 is used; when an angle of the third direction with respect to the reference direction changes as much as at least a specified angle or more, the processor 170 may check a second angle between the reference direction and the third direction. The processor 170 may determine touch coordinate information according to a touch input based on the second angle between the reference direction and the third direction. For example, the processor 170 may check an angle difference (e.g., the attitude angle of the input device 100) between the first angle and the second angle (in a clockwise direction) and may determine touch coordinate information based on the angle difference.

According to certain embodiments, the sensor circuit 120 may include a grip sensor capable of detecting the third direction, and an acceleration sensor, proximity sensor, or grip sensor associated with detecting a movement of the input device 100. In this case, the processor 170 may determine whether the movement of the input device 100 meets the specified condition; when the movement of the input device 100 meets the specified condition, the processor 170 may determine the third direction by using the gyro sensor and may determine a touch coordinate value based on the third direction. The processor 170 may be unable to detect the third direction due to a magnetic field generated by a surrounding metal material (e.g., iron or copper) except for a magnetic field of the Earth. In this case, the processor 170 may guide a touch input in the first direction through the computing device 200 or the output device 140 and may determine the first direction based on a plurality of first touch inputs. Alternatively, the processor 170 may guide the user to grip the input device 100 through the computing device 200 or the output device 140 and may determine the first direction based on a touch of the user gripping the input device 100.

According to certain embodiments, the input device 100 may further provide a mouse function. For example, the input device 100 may include a light-emitting element that emits a light to the outside of the bottom surface of the input device 100 and a photo detector that receives a reflected light emitted from a light source. The processor 170 may check a movement (i.e., a movement direction and a movement distance) of the input device 100 based on the amount of light sensed through the photo detector and may determine movement input information associated with the mouse function. The processor 170 may send the determined movement input information to the computing device 200. According to an embodiment, the processor 170 may detect a pressure magnitude of a touch made on the touch pad 110 by using the sensor circuit 120 and may send information about the pressure magnitude to the computing device 200 through the communication circuit 150.

According to certain embodiments, at least part of a configuration of the input device 100 may be controlled by the computing device 200. For example, the input device 100 may send the movement-related information (e.g., the movement magnitude information) to the computing device 200 through the communication circuit 150. When that the movement magnitude is greater than or equal to the specified magnitude is checked from the movement-related information, the computing device 200 may output an UI screen guiding a touch input in the first direction. For another example, the computing device 200 may receive touch input information (e.g., touch coordinate values of the x and y axes of the touch pad 110), which is based on the reference direction of the touch pad 110, from the input device 100, may correct the touch input information based on the attitude angle of the input device 100, and may move a pointer object based on the corrected touch input information. Below, a relevant embodiment will be described with reference to FIG. 5.

Figure 5:
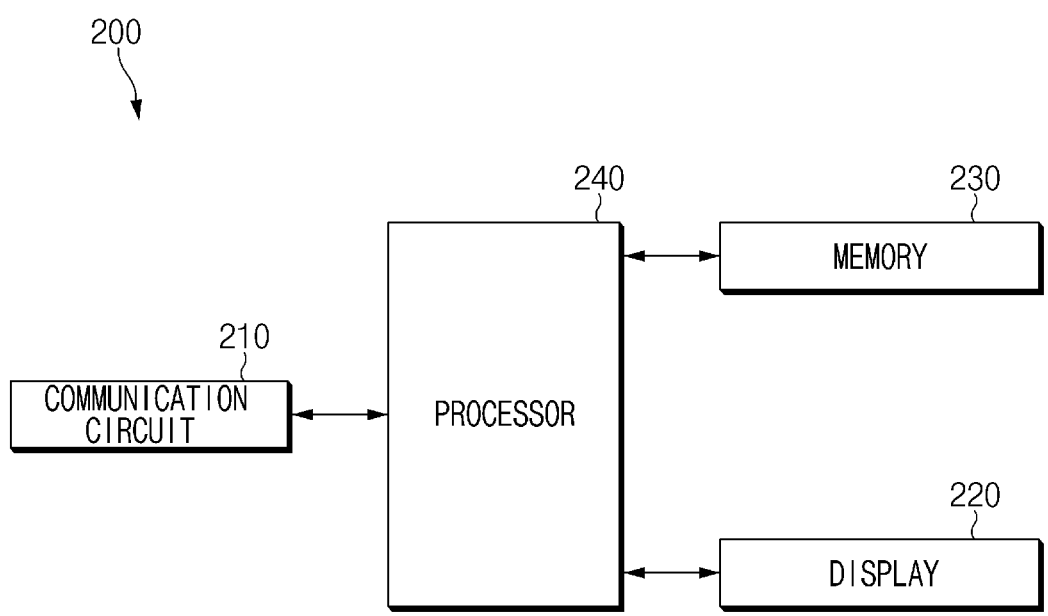
FIG. 5 illustrates a configuration diagram of a computing device according to an embodiment.

FIG. 5 illustrates a configuration diagram of a computing device according to an embodiment.

Referring to FIG. 5, the computing device 200 according to an embodiment may include a communication circuit 210, a display 220, a memory 230, and a processor 240. In an embodiment, the computing device 200 may not include some of the above components or may further include any other component(s). In an embodiment, some of the components of the computing device 200 may be combined to form one entity, which may identically perform functions of the corresponding components before the combination.

According to an embodiment, the communication circuit 210 may establish a communication channel capable of communicating with the computing device 200. For example, the communication channel may include a channel for wireless communication such as Bluetooth communication or
Wi-Fi Communication.

The display 220 may display, for example, various kinds of content (e.g., a text, an image, a video, an icon, and/or a symbol). The display 220 may include, for example, a liquid crystal display (LCD), a light-emitting diode (LED) display, or an organic LED (OLED) display. The display 220 may display an image of at least one of an execution screen of a pointer object or an execution screen of an application depending on a command of the processor 240.

For example, the memory 230 may store a command or data associated with at least one other component of the computing device 200. The memory 230 may be a volatile memory (e.g., a RAM), a nonvolatile memory (e.g., a ROM or a flash memory), or a combination thereof.

The processor 240 may perform computation (or calculation) or data processing associated with a control and/or a communication of at least one other component(s) of the computing device 200 by using the instructions stored in the memory 230. For example, the processor 240 may include at least one of a central processing unit (CPU), a graphics processing unit (GPU), a microprocessor, an application processor, an application specific integrated circuit (ASIC), or a field programmable gate arrays (FPGA) and may include a plurality of cores.

According to an embodiment, the processor 240 may receive touch coordinate information from the input device 100 and may move and display a pointer object depending on the received touch coordinate information. For example, when that a touch coordinate value changes from the left in a right direction is detected from the touch coordinate information, the processor 240 may move the pointer object from the left in the right direction depending on the change in the touch coordinate value.

According to an embodiment, the processor 240 may receive movement-related information of the input device 100 from the input device 100 through the communication circuit 210 and may determine whether a movement of the input device 100 meets the specified condition, based on the movement-related information. For example, the processor 240 may determine whether a magnitude of the movement (e.g., at least one of an acceleration or an angular velocity) of the input device 100 is greater than or equal to the specified magnitude, based on the movement-related information. For another example, based on the movement-related information (e.g., distance information), the processor 240 may determine whether a distance between the input device 100 and a floor on which the input device 100 is put changes from a first specified distance (e.g., about 1 cm) or more to less than a second specified distance (e.g., about 0.3 cm) (<the first specified distance). For another example, the processor 240 may determine whether a position of a user touch on the input device 100 changes, based on the movement-related information (e.g., position information about a touch on a side surface of the input device 100), According to certain embodiments, the input device 100 may determine whether the movement of the input device 100 meets the specified condition; when the movement of the input device 100 meets the specified condition, the input device 100 may send, to the computing device 200, information indicating that the movement meets the specified condition.

According to an embodiment, when the processor 240 checks that the movement of the input device 100 meets the specified condition, the processor 240 may guide a touch input in the first direction through the display 220. For example, the processor 240 may display, through the display 220, a text "Drag the touch pad 110 from the left to the right 5 times" and an animation of dragging the touch pad 110 from the left to the right 5 times. After guiding the touch input in the first direction, the processor 240 may receive a plurality of first touch inputs in the first direction (e.g., the x-axis direction) and may determine the first direction based on the plurality of first touch inputs. The processor 240 may display an UI screen guiding (or requesting) the plurality of first touch inputs and may then guide the touch input in the second direction. For example, the processor 240 may display, through the display 220, a text "Drag the touch pad 110 from the top to the bottom 5 times" and an animation of dragging the touch pad 110 from the top to the bottom 5 times. After guiding the touch input in the second direction, the processor 240 may determine the second direction (e.g., the y-axis direction) based on the plurality of second touch inputs in the second direction.

According to an embodiment, the processor 240 may receive information about the third direction of the outside of the input device 100 from the input device 100 and may determine the first direction of the input device 100 based on the information about the third direction. For example, the processor 240 may check a first angle between the first direction, which corresponds to a state in which the reference direction of the input device 100 and the first direction of the display 220 are matched, and the third direction from the memory 230 and may check a second angle between the first direction and the third direction based on the received information about the third direction. The processor 240 may check an angle difference between the first angle and the second angle, that is, an angle change of the third direction (i.e., the attitude angle of the input device 100) and may correct the received touch coordinate value based on the checked change so as to correspond to the coordinate system of the display 220.

According to an embodiment, the processor 240 may correct the touch coordinate value based on the checked angle and may move a pointer object depending on the corrected touch coordinate value. For example, the processor 240 may check the touch coordinate value from the touch coordinate information, may replace the checked touch coordinate value with a touch coordinate value according to the attitude angle of the input device 100 checked from the memory 230, and may move the pointer object based on the replaced touch coordinate value. For another example, the processor 240 may check the touch coordinate value from the touch coordinate information, may correct the checked touch coordinate value by using a correction value according to the attitude angle of the input device 100 checked from the memory 230, and may move the pointer object based on the corrected touch coordinate value.

According to an embodiment, the processor 240 may receive rotation input information from the input device 100 through the communication circuit 210 and may provide a function of a running application program based on the rotation input information. For example, when the processor 240 connects with the input device 100 for communication, the processor 240 may display a function list (e.g., 212 of FIG. 2) capable of being provided through the input device 100 and may provide a function selected from the function list (e.g., 212 of FIG. 2) based on the rotation input information. The processor 240 may adjust, for example, a drawing color or a picture size in conjunction with an application providing an illustration function, based on the rotation input information.

According to an embodiment, the processor 240 may receive touch pressure information through the communication circuit 210 and may execute a function indicated by a pointer object (e.g., an application corresponding to an icon indicated by the pointer object) based on the touch pressure information.

According to an embodiment, the processor 240 may receive movement input information from the input device 100, which is used as a mouse, through the communication circuit 210 and may display a pointer object based on at least one of a movement distance or a movement direction of the input device 100 according to the movement input information.

According to certain embodiments, the processor 240 may receive touch coordinate information including a corrected touch coordinate value from the input device 100 and may move a pointer object depending on the touch coordinate value included in the received touch coordinate information. In this case, the processor 240 may guide a touch input in the first direction (or the second direction), and the processor of the input device 100 may determine the first direction (or the second direction) based on a plurality of first touch inputs (or a plurality of second touch inputs).

According the above embodiment, even though the attitude angle of the input device 100 changes while the input device 100 is operated by the user, the computing device 200 may control a movement of a pointer object so as to correspond to a user touch input on the input device 100.

Figure 6:
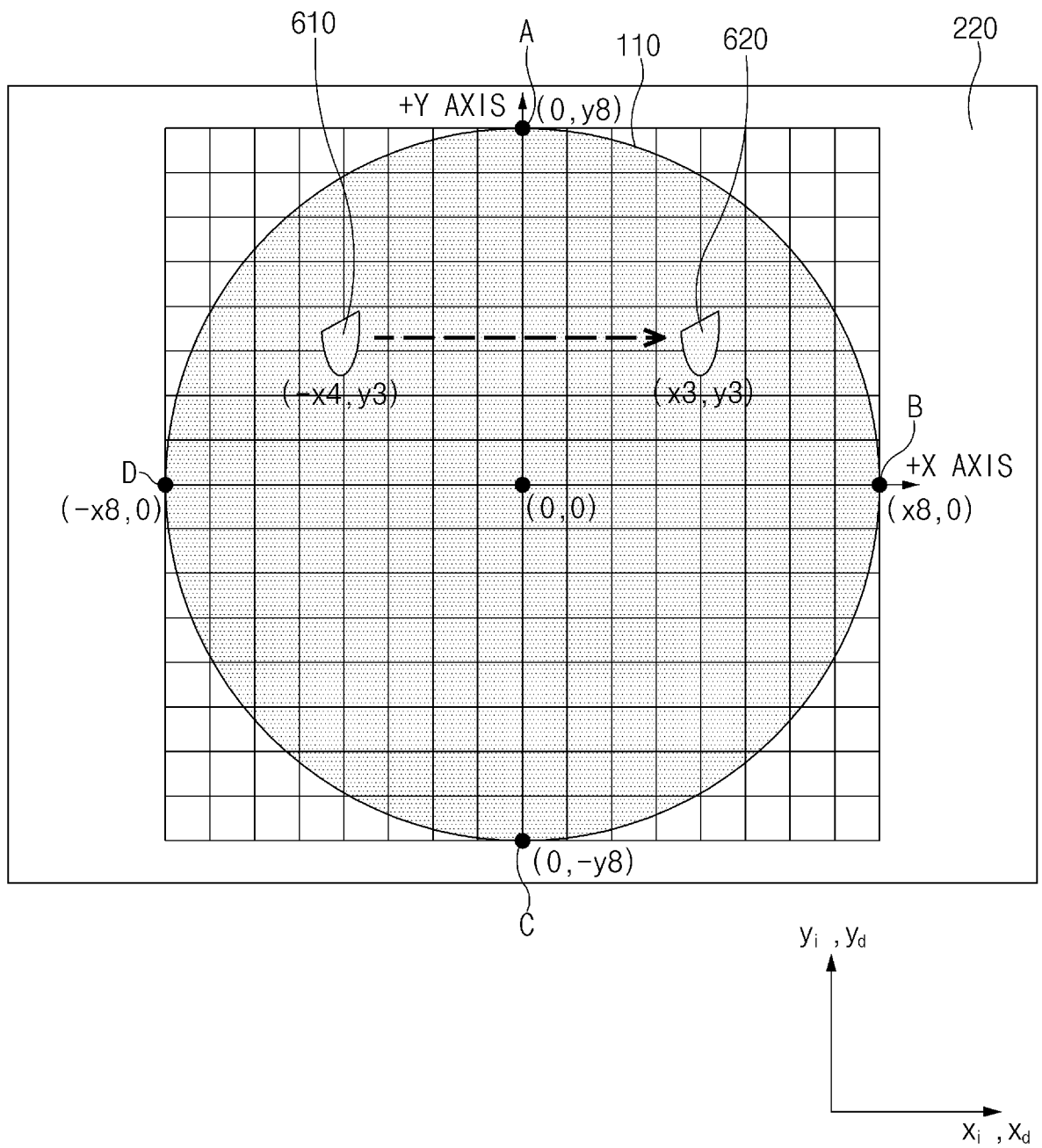
FIGS. 6 and 7 are diagrams for describing a touch coordinate correcting method according to an embodiment.
Figure 7:
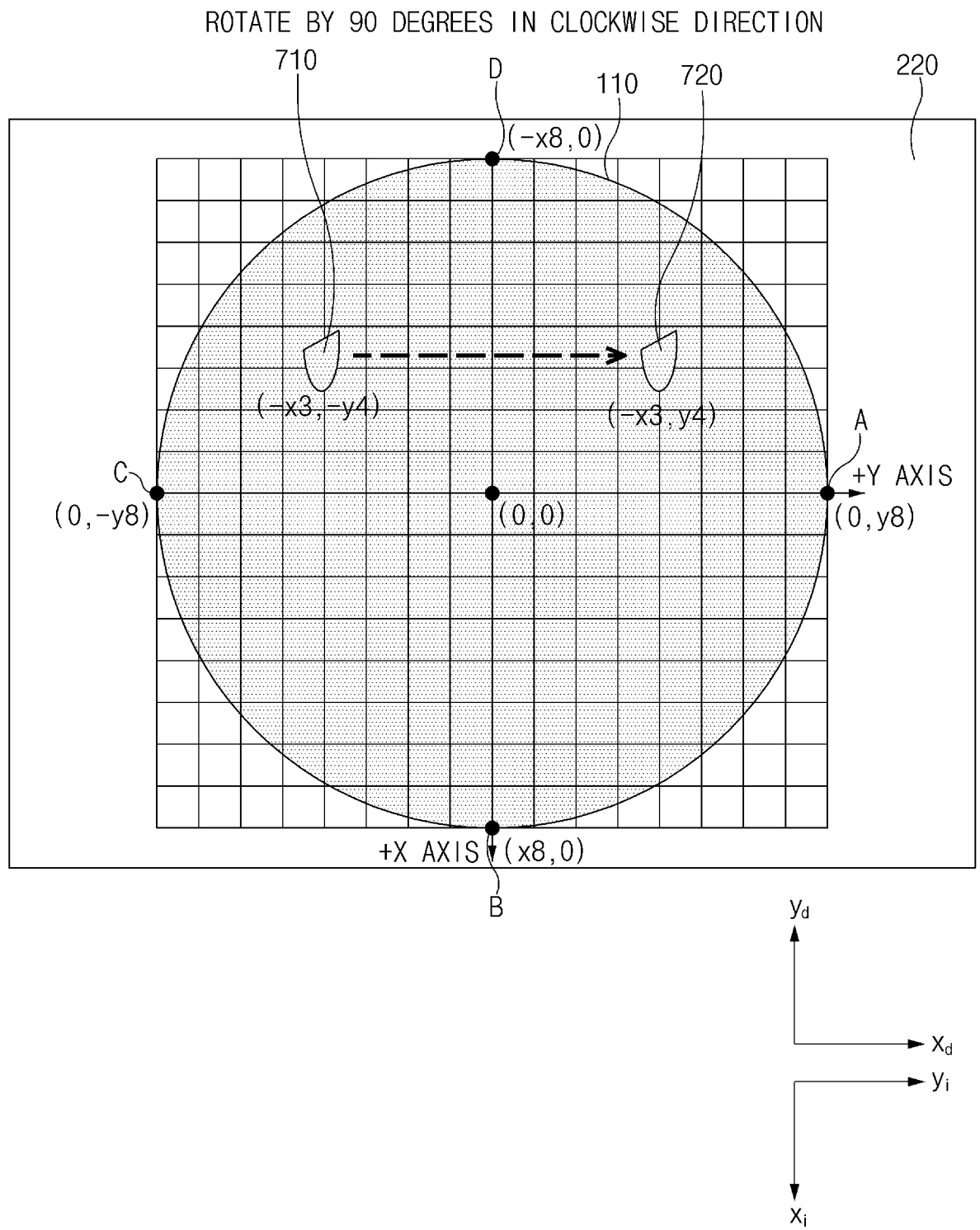

FIGS. 6 and 7 are diagrams for describing a touch coordinate correcting method according to an embodiment. In FIGS. 6 and 7, both the display 220 and the touch pad 110 correspond to an x, y coordinate system. FIGS. 6 and 7 describe a correlation between the display 220 (e.g., the display 220 of FIG. 5) of the computing device 200 (e.g., the computing device 200 of FIG. 5) and the touch pad 110 (e.g., the touch pad 110 of FIG. 4) of the input device 100 (e.g., the input device 100 of FIG. 4) and the coordinate system. The touch pad 110 may be enlarged with respect to the display 220. That is, the scale of the coordinate system with respect to the touch pad 110 and the scale of the coordinate system with respect to the display 220 may be different, thereby causing the display 220 to correspond to an enlarged touch pad 110. The enlarged touch pad 110 is shown disposed on the display 220 so that the enlarged touch pad 110 and the display 220 overlap each other.

Referring to FIGS. 6 and 7, the touch pad 110 may be in the shape of a circle, and one point of a central area of the touch pad 110 (e.g., a center point of the touch pad 110) may be used as the origin (0, 0). A y-axis direction $y_i$ (e.g., the second direction) of the touch pad 110 may be a direction of a straight line that starts from point "C", passes through the origin, and reaches point "A", and an x-axis direction $x_i$ of the touch pad 110 may be a direction of a straight line that starts from point "D", passes through the origin, and reaches point "B".

Referring to FIG. 6, when the input device 100 does not rotate, the x-axis and y-axis directions of the touch pad 110 may respectively correspond to x-axis and y-axis directions $x_d$ and $y_d$ of the display 220 of the computing device 200. In this case, even though the input device 100 sends touch coordinate information of the touch pad 110 without correction, the computing device 200 may move a pointer object based on the touch coordinate information so as to correspond to a drag direction of the touch pad 110. For example, when the user touches a first point 610 of the touch pad 110 and then performs a drag operation to a second point 620 of the touch pad 110, the input device 100 may generate touch coordinate information in the order of (−x4, y3), (−x3, y3), (−x2, y3), (−x1, y3), (0, y3), (x1, y3), (x2, y3), (x3, y3), and (x4, y3). The computing device 200 may move and display a pointer object displayed on the display 220 in the x-axis direction of the display 220 from an initial position as much as 8 points in units of point.

Referring to FIG. 7, when the input device 100 rotates by +90 degrees clockwise, the x-axis direction $x_i$ of the touch pad 110 may correspond to a −y-axis direction $-y_d$ of the display 220, and the y-axis direction $y_i$ of the touch pad 110 may correspond to the x-axis direction $x_d$ of the display 220. That is, when the user moves from left to right, the movement appears to the user to correspond to the +x axis direction. However, due to the rotation, the movement actually corresponds to a movement in the +y axis direction in the coordinate system. Accordingly, the input device 100 subtracts 90 degrees from the direction in the coordinate system, thereby resulting in providing the computing device 200 with a movement in the +x axis direction. As a result, the input to the computing device 200 is for the apparent direction of the movement to the user.

In this case, the input device 100 may correct touch coordinate information detected by using the touch pad 110, based on the x-axis and y-axis directions of the display 220 and may send the corrected touch coordinate information to the computing device 200. The computing device 200 may move the pointer object based on the corrected touch coordinate information so as to correspond to the drag direction on the touch pad 110. For example, when the user touches the first point 610 of the touch pad 110 and then performs a drag operation to the second point 620 of the touch pad 110, the input device 100 may generate touch coordinate information in the order of (−x3, y4), (−x3, −y3) . . . (−x3, y3), and (−x3, y4). The input device 100 may correct the generated touch coordinate information to touch coordinate information of (−x4, y3), (−x3, y3) . . . (x3, y3), and (x4, y3) so as to correspond to the x-axis and y-axis directions of the display 220 of the computing device 200. As such, the computing device 200 may move and display the pointer object displayed on the display 220 in the x-axis direction of the display 220 from the initial position as much as 8 points.

According to the above embodiment, in the case where the input device 100 rotates while the user uses the input device 100, the coordinate axes (i.e., x and y axes) of the touch pad 110 and the coordinate axes (i.e., x and y axes) of the display 220 of the computing device 200 may not coincide with each other. In this case, the input device 100 may correct touch coordinate information of the touch pad 110 based on an angle between the reference direction of the touch pad 110 and the first direction (i.e., the x-axis direction of the display 220) of the outside of the input device 100, so as to coincide with the display 220.

Figure 8:
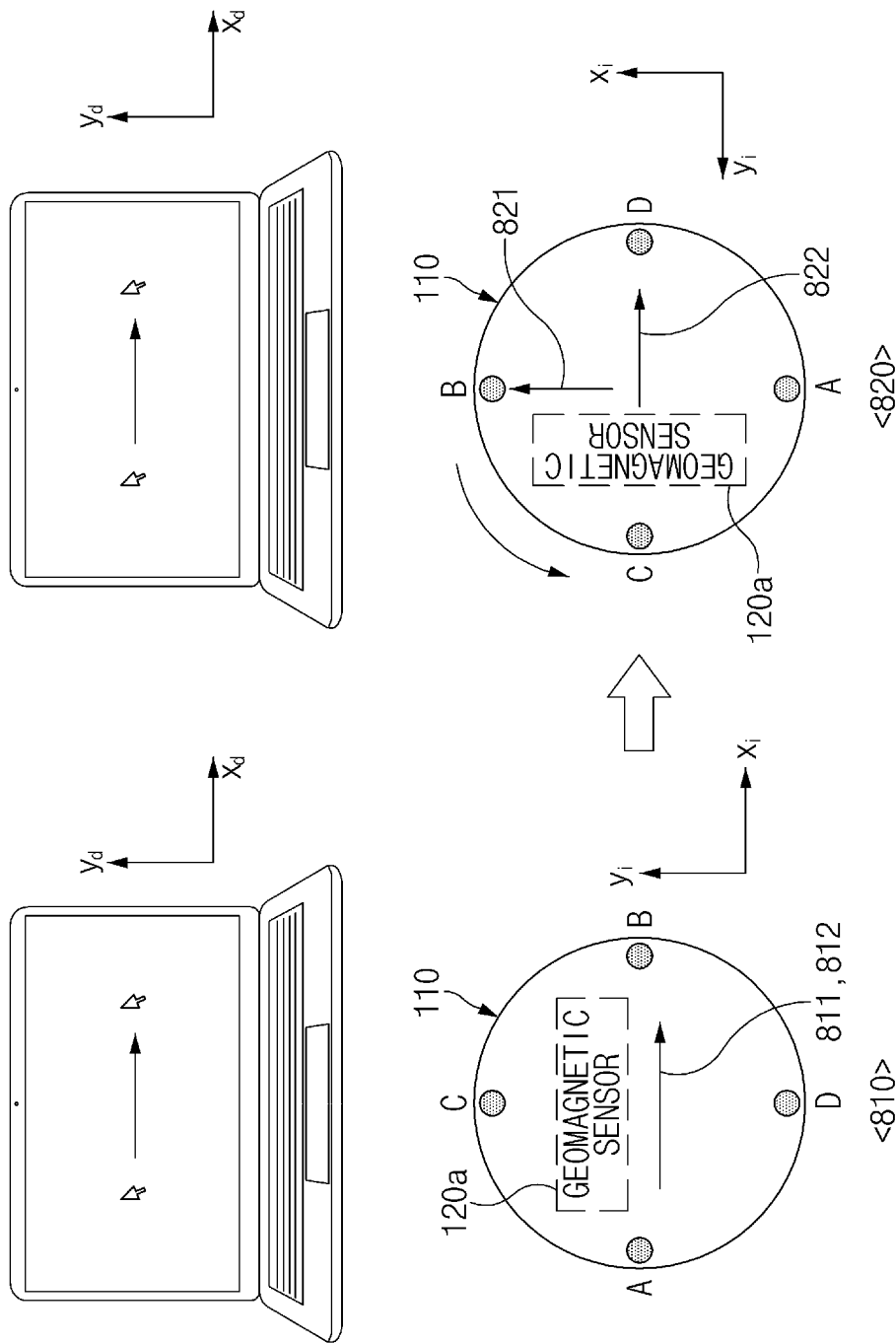
FIG. 8 illustrates a method in which an input device recognizes a first direction based on a geomagnetic sensor, according to an embodiment.

FIG. 8 illustrates a method in which an input device recognizes a first direction based on a geomagnetic sensor, according to an embodiment.

Referring to FIG. 8, the input device 100 may change from state <810> in which the input device 100 is placed such that the reference direction of the input device 100 coincides with the first direction of the display 220 (e.g., in a positive direction) to state <820> in which the input device 100 rotates by 90 degrees in a counterclockwise direction. In this case, by using a geomagnetic sensor 120a, the input device 100 may detect a first angle (i.e., 0 degree) between a reference direction 811 facing from point "A" to point "B" of the input device 100 and a third direction 812 in state <810> and may detect a second angle (i.e., 270 degrees) between a reference direction 821 facing from point "A" to point "B" and a third direction 822 in state <820>. Afterwards, the input device 100 may determine an angle difference between the first angle and the second angle as the attitude angle of the input device 100 and may correct a touch coordinate value according to a touch input to a touch coordinate value according to the attitude angle.

Figure 9:
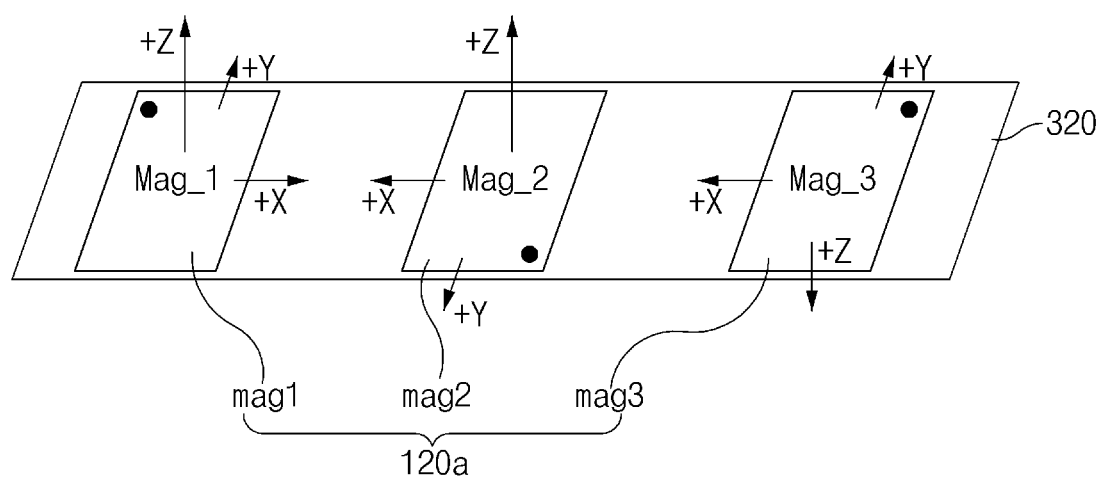
FIG. 9 illustrates a geomagnetic sensor installed in an input device according to an embodiment.

FIG. 9 illustrates a geomagnetic sensor installed in an input device according to an embodiment.

Referring to FIG. 9, the geomagnetic sensor 120a according to an embodiment may include a first magnet sensor mag1, a second magnet sensor mag2, and a third magnet sensor mag3. The first magnet sensor mag1, the second magnet sensor mag2, and the third magnet sensor mag3 may be disposed on the printed circuit board 320, so as to be spaced from each other at regular intervals and such that axis directions are different from each other. For example, the second magnet sensor mag2 may be disposed such that x and y axes of the second magnet sensor mag2 rotate by 180 degrees in a counterclockwise direction around a z axis of the first magnet sensor mag1. The third magnet sensor mag3 may be disposed such that x and y axes of the first magnet sensor mag1 rotate by 180 degrees in a clockwise direction around an y axis of the first magnet sensor mag1.

According to an embodiment, the input device 100 (e.g., the processor 170 of the input device 100) including the geomagnetic sensor 120a may detect an average value of an x-axis magnetic force detected by the first magnet sensor mag1 and an x-axis magnetic force detected by the second magnet sensor mag2 as a magnetic force in the x-axis direction. The input device 100 may detect an average value of a y-axis magnetic force detected by the first magnet sensor mag1 and a y-axis magnetic force detected by the second magnet sensor mag2 as a magnetic force in the y-axis direction. The input device 100 may detect an average value of a z-axis magnetic force detected by the first magnet sensor mag1 and a z-axis magnetic force detected by the third magnet sensor mag3 as a magnetic force in the z-axis direction. The input device 100 may detect the third direction (e.g., a true north direction), which is defined by using the input device 100 as the criteria, based on the magnetic forces in the x-axis, y-axis, and z-axis directions.

Figure 10:
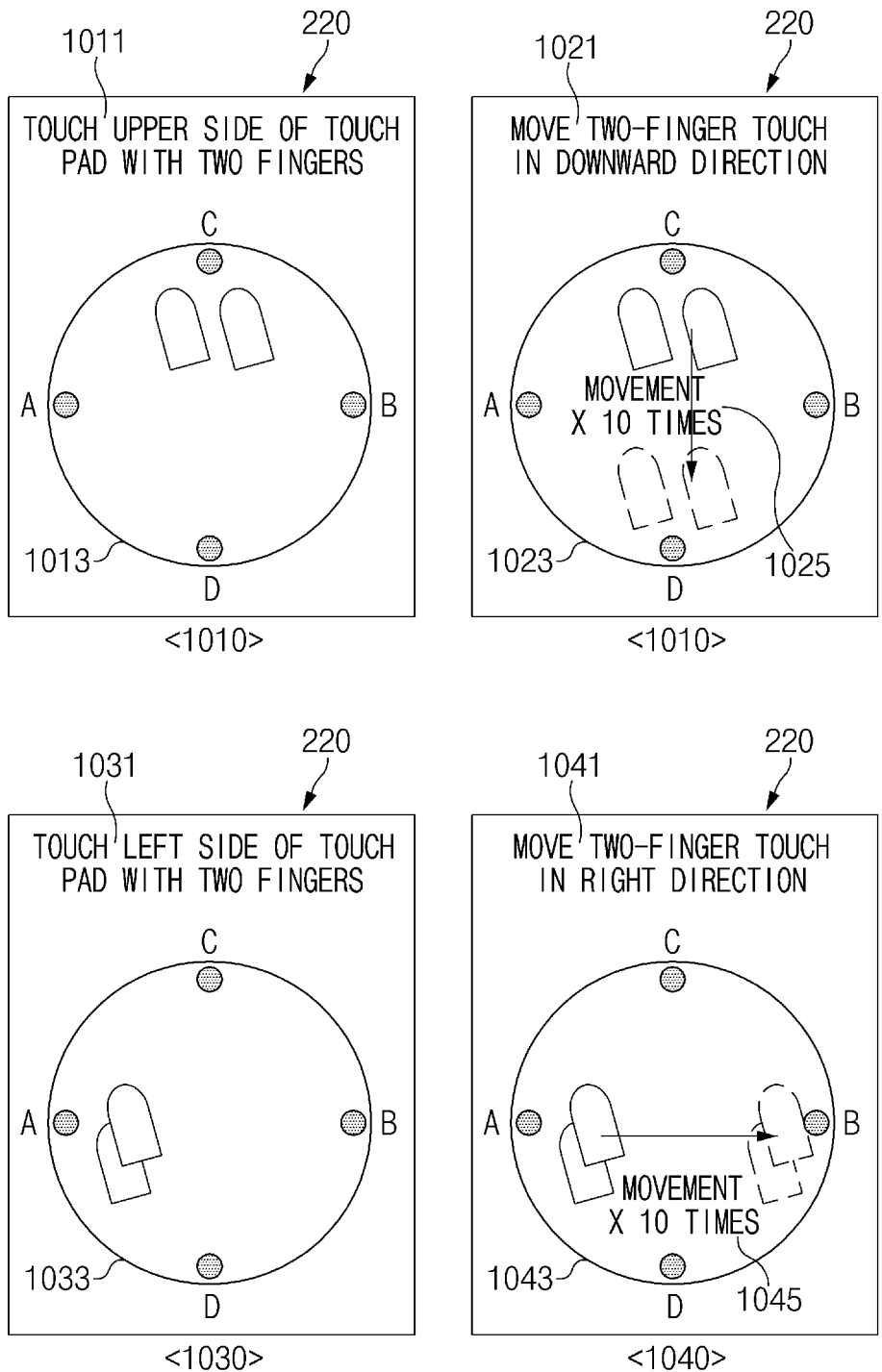
FIG. 10 illustrates an UI screen in which a computing device guides touch inputs in a first direction and a second direction, according to an embodiment.

FIG. 10 illustrates an UI screen in which the computing device 200 provides prompts to the user for inputs in a reference direction, for determining a first direction and a second direction, according to an embodiment.

Referring to FIG. 10, in reference numeral 1010, the computing device 200 may display a guide text 1011 of "Put down the input device 100 and touch the upper side of the touch pad 110 with two fingers" and an image 1013 in which two finger objects overlap the upper side of the touch pad 110.

In reference numeral 1020, the computing device 200 may display a guide text 1021 of "Move a two-finger touch in a downward direction" and an animation image 1023 in which two finger objects moves from the upper side of the touch pad 110 in a downward direction plural times (e.g., 10 times). Accordingly, the reference direction is the −y axis direction (top to bottom). The computing device 200 may further display a text 1025 guiding the number of times of movement (e.g., movement*10 times). In this regard, the input device 100 or the computing device 200 may obtain a plurality of first touch inputs on the touch pad 110 and may determine the first direction (i.e., the x-axis direction of the display 220) based on the plurality of first touch inputs.

In reference numeral 1030, the computing device 200 may display a guide text 1031 of "Touch the left side of the touch pad 110 with two fingers" and an image 1033 in which two finger objects overlap each other on the left side of the touch pad 110.

In reference numeral 1040, the computing device 200 may display a guide text 1041 of "Move a two-finger touch in a right direction" and an animation image 1043 in which two finger objects moves from the left side of the touch pad 110 in a right direction plural times (e.g., 10 times). Accordingly, here, the reference direction is the +x axis direction. The computing device 200 may further display a text 1045 guiding the number of times of movement (e.g., movement*10 times). In this regard, the input device 100 or the computing device 200 may obtain a plurality of second touch inputs on the touch pad 110 and may determine the second direction (i.e., the y-axis direction of the display 220) based on the plurality of second touch inputs.

Figure 11:
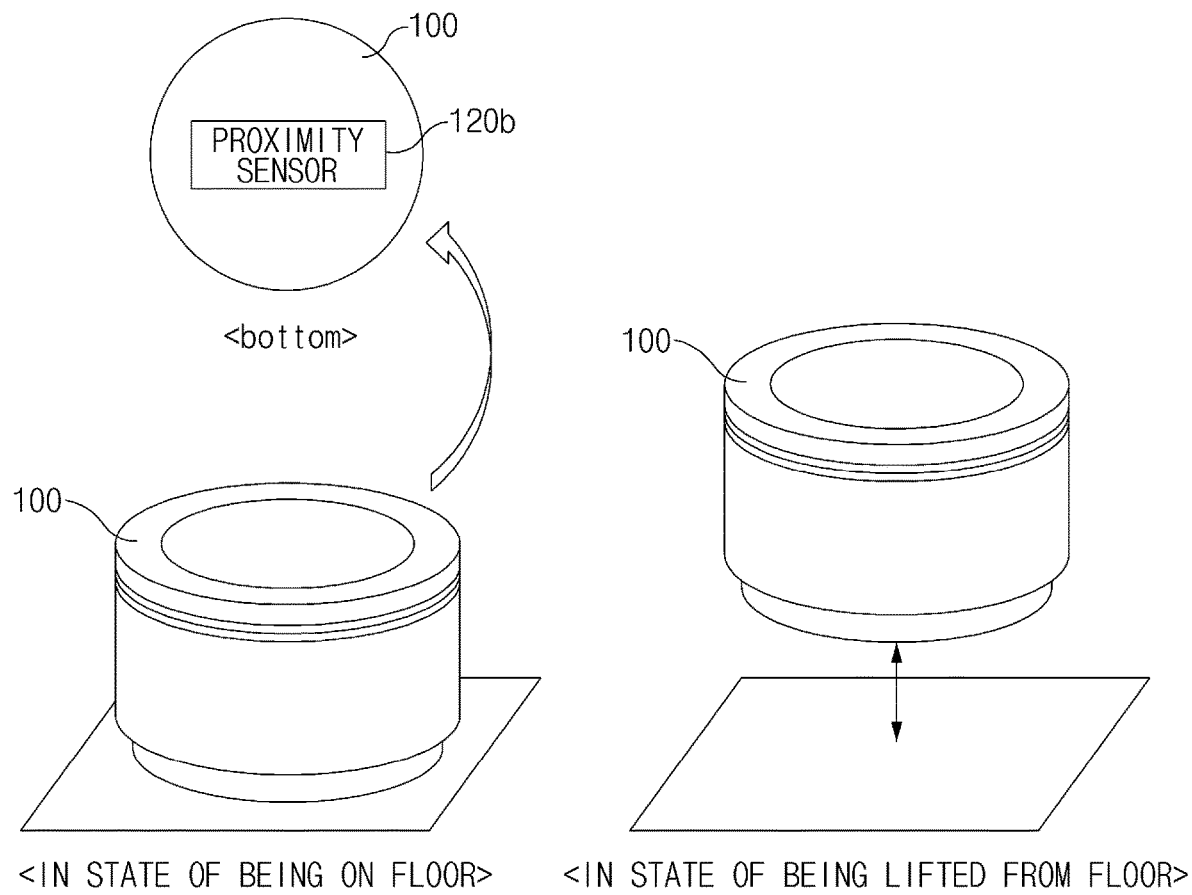
FIG. 11 illustrates a geomagnetic sensor installed in an input device according to an embodiment.

FIG. 11 illustrates a proximity sensor 120b installed in an input device (e.g., the input device 100 of FIG. 4) according to an embodiment.

Referring to FIG. 11, the proximity sensor 120b (e.g., the sensor circuit 120 of FIG. 4) may be exposed on the second surface of the input device 100. In the case where the input device 100 is on the floor, the proximity sensor 120b may detect a reflected light of a first intensity. In contrast, in the case where the input device 100 is lifted from the floor, the proximity sensor 120b may detect a reflected light of a second intensity smaller than the first intensity. Accordingly, based on the intensities of the reflected lights detected by the proximity sensor 120b, the input device 100 may distinguish that the input device 100 is lifted from the floor from that the input device 100 is put on the floor.

Figure 12:
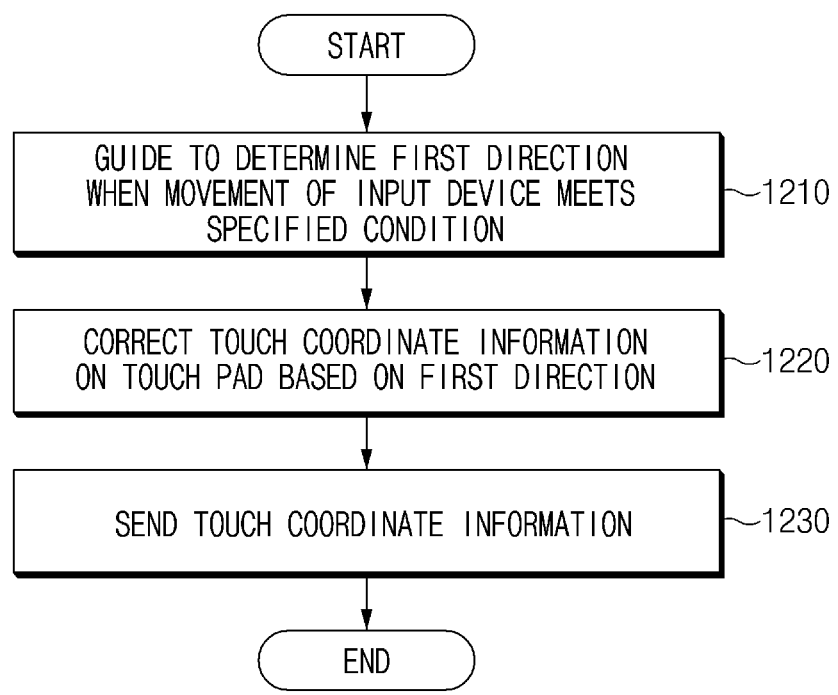
FIG. 12 illustrates an example of a method in which an input device determines touch coordinates, according to an embodiment.

FIG. 12 illustrates an example of a method in which an input device determines touch coordinates, according to an embodiment.

In operation 1210, an input device (e.g., the input device 100 of FIG. 4) may guide to determine the first direction (e.g., the x-axis direction of the display 220 of the computing device) when that a movement of the input device 100 meets the specified condition is detected by using a sensor circuit (e.g., the sensor circuit 120 of FIG. 4). For example, the input device 100 may output a guide voice or guide screen guiding a touch input in the first direction through the output device 140 installed therein or through the computing device 200.

When a touch input on the touch pad 110 is detected by using the touch pad 110, in operation 1220, the input device 100 may determine touch coordinate information according to the touch input based on an angle between the reference direction on the touch pad 110 and the first direction. For example, when a touch coordinate value is detected from the touch input, the input device 100 may check a correction value corresponding to the detected touch coordinate value and the checked angle from the memory 160 and may correct the detected touch coordinate value by using the correction value (e.g., may replace the touch coordinate value with the correction value).

In operation 1230, the input device 100 may send the touch coordinate information to the computing device 200 through a communication circuit (e.g., the communication circuit 150 of FIG. 4). In this case, the computing device 200 may move a pointer object based on the corrected touch coordinate information.

Figure 13:
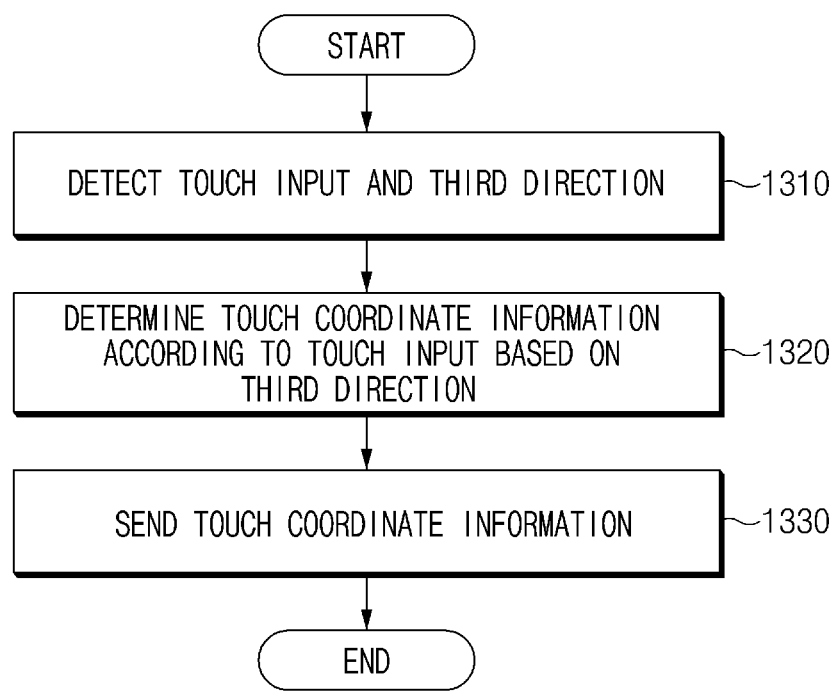
FIG. 13 illustrates another example of a method in which an input device determines touch coordinates, according to an embodiment.

FIG. 13 illustrates another example of a method in which an input device determines touch coordinates, according to an embodiment.

Referring to FIG. 13, in operation 1310, the input device 100 may detect a touch input by using the touch pad 110 and may detect the third direction of the outside of the input device 100 by using the sensor circuit 120. For example, the input device 100 may detect a true north direction (i.e., the third direction) by using a geomagnetic sensor.

In operation 1320, the input device 100 may determine touch coordinate information according to a touch input based on the third direction. For example, the input device 100 may check a first angle between the reference direction and the third direction from the memory 160 in a state where the reference direction of the touch pad 110 and the first direction of the display 220 of the computing device 200 are matched. When the angle between the reference direction and the third direction changes, the input device 100 may check a second angle between the reference direction and the third direction and may determine a touch coordinate value according to a touch input value based on a difference between the first angle and the second angle. In this regard, the input device 100 may store a correction value for all sensing nodes on the touch pad 110 based on an angle difference, in the memory 160. When a touch coordinate value according to a touch input is detected, the input device 100 may correct the touch coordinate value by using the correction value corresponding to the angle difference and may determine touch coordinate information including the corrected touch coordinate value.

In operation 1330, the input device 100 may send the determined touch coordinate information to the computing device 200. In this case, the computing device 200 may move a pointer object based on the corrected touch coordinate information.

Figure 14:
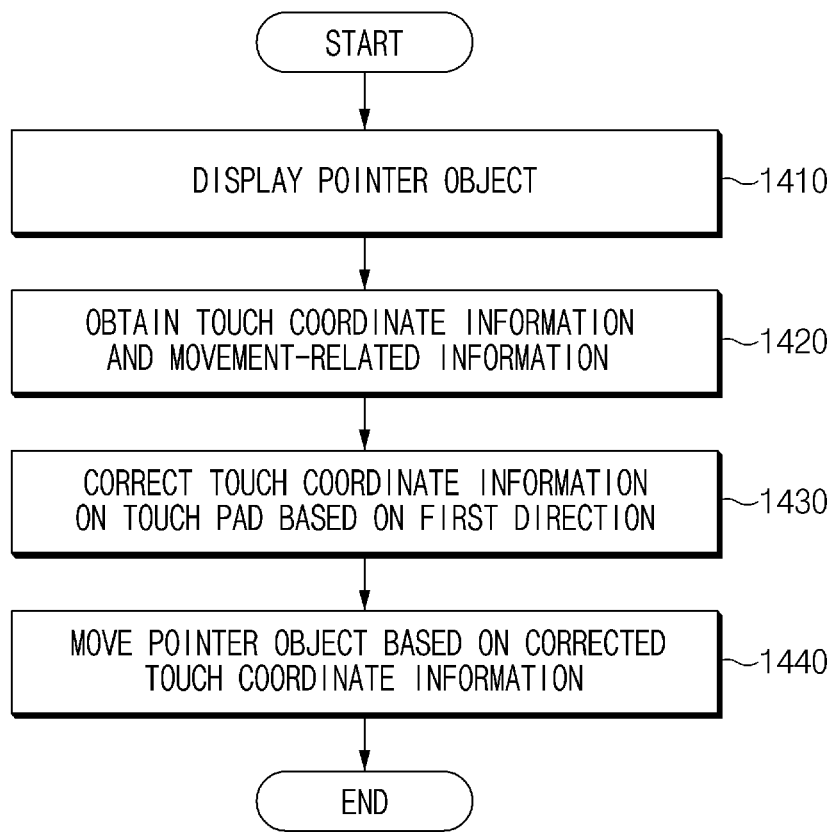
FIG. 14 illustrates a method in which a computing device moves a pointer object, according to an embodiment.

FIG. 14 illustrates a method in which a computing device moves a pointer object, according to an embodiment.

Referring to FIG. 14, in operation 1410, a computing device (e.g., the computing device 200 of FIG. 5) may display a pointer object on a display (e.g., the display 220 of FIG. 5). For example, when the computing device 200 connects with the input device 100 for communication, the computing device 200 may display the pointer object on the display 220.

In operation 1420, the computing device 200 may obtain touch coordinate information and movement-related information from the input device 100. For example, the computing device 200 may obtain the touch coordinate information and the movement-related information that the input device 100 periodically sends. The touch coordinate information may include, for example, a coordinate value according to a user touch input on the touch pad 110 of the input device 100. The movement-related information may include, for example, at least one of movement magnitude information (e.g., an acceleration, an angular velocity, or a proximity distance) of the input device 100, a position of a touch input of the user gripping the input device 100, and information about the third direction of the outside of the input device 100.

In operation 1430, the computing device 200 may correct the touch coordinate information on the touch pad 110 based on the first direction. For example, the computing device 200 may check an angle between the reference direction of the touch pad 110 and the first direction of the display 220 and may correct the touch coordinate information based on the angle. For another example, the computing device 200 may check a first angle between the reference direction on the touch pad 110 and the third direction of the outside of the input device 100 and a second angle between the reference direction on the touch pad 110 and the third direction changed, and may correct the touch coordinate information based on the first angle and the second angle.

In operation 1440, the computing device 200 may move the pointer object displayed on the display 220 based on the corrected touch coordinate information.

In certain embodiments, the input device 100 can provide the computing device 200 with the angle between the reference direction and the first direction and/or second direction. The computing device 200 can then correct the positional and directional information received from the input device 100.

Figure 15:
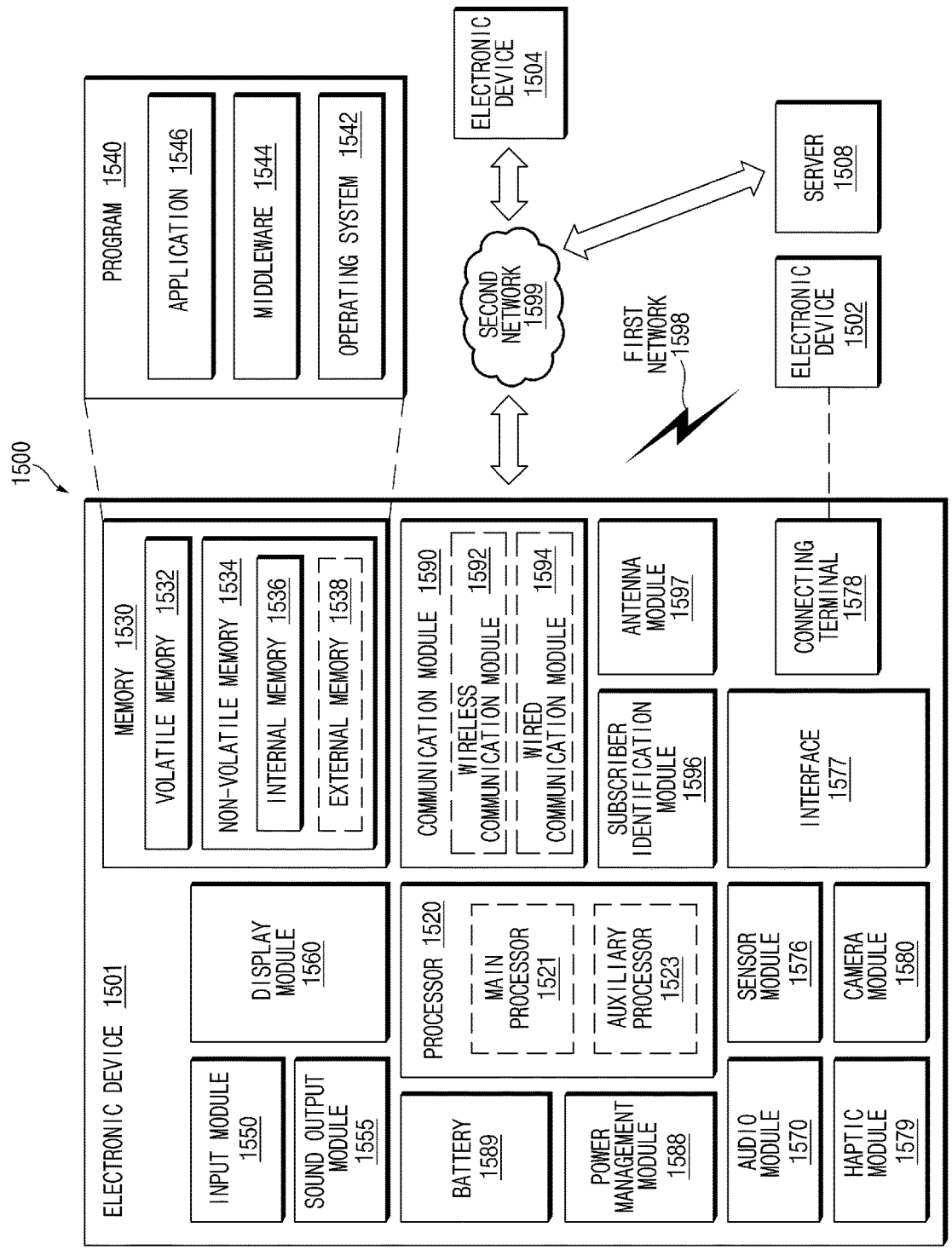
FIG. 15 illustrates a block diagram of an electronic device, which controls a movement of a pointer object, in a network environment according to certain embodiments.

FIG. 15 is a block diagram illustrating an electronic device 1501 in a network environment 1500 according to certain embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520 (e.g., the processor 170 of FIG. 4 or the processor 240 of FIG. 5), a memory 1530 (e.g., the memory 160 of FIG. 4 or the memory 230 of FIG. 5), an input device 1550 (e.g., the touch pad 110 of FIG. 4), a sound output device 1555) (e.g., the output device 140 of FIG. 4), a display device 1560 (e.g., the display 220 of FIG. 5), an audio module 1570, a sensor module 1576, an interface 1577, a haptic module 1579, a camera module 1580, a power management module 1588, a battery 1589, a communication module 1590 (e.g., the communication circuit 150 of FIG. 4 or the communication circuit 210 of FIG. 5), a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

According to certain embodiments described above, an input device (e.g., the input device 100) may include a touch pad (e.g., the touch pad 110 of FIG. 1) that is exposed through a first surface of the input device, a sensor circuit (e.g., the sensor circuit 120 of FIG. 1) that senses a movement of the input device, a communication circuit (e.g., the communication circuit 150 of FIG. 4) that communicates with an external device, and a processor (e.g., the processor 170 of FIG. 4) connected to the touch pad, the sensor circuit, and the communication circuit. The processor may when the sensor circuit detects movement of the input device satisfies a specified condition, prompt a user to enter predetermined inputs indicating a reference direction, receive actual user inputs indicating a first direction, and determine the first direction based on the actual user inputs, may determine touch coordinate information for the touch input on the touch pad based on an angle between the reference direction on the touch pad and the first direction when the touch input is detected by using the touch pad, and may send the touch coordinate information to the external device through the communication circuit.

According to certain embodiments, the sensor circuit (e.g., the sensor circuit 120 of FIG. 1) may include at least one of a gyro sensor (e.g., the input device 100 of FIG. 1), an acceleration sensor, or a proximity sensor exposed through a second surface facing away from the first surface, and specified condition is that the movement of the input device has a magnitude is greater than or equal to a specified magnitude.

According to certain embodiments, the sensor circuit (e.g., the sensor circuit 120 of FIG. 1) may include a grip sensor disposed on at least a portion of a side surface of the input device (e.g., the input device 100 of FIG. 1), and the processor (e.g., the processor 170 of FIG. 4) may detect a finger of a user gripping the input device by using the grip sensor, may check the movement of the input device based on a position of the finger, and may determine that the movement meets the specified condition when the position of the finger changes by at least a specified distance.

According to certain embodiments, wherein prompting the user to enter the predetermined touch inputs comprises prompting the user to provide an input facing the first direction using an output device, wherein the actual user inputs comprise a plurality of touch inputs on the touch pad.

According to certain embodiments, the input device (e.g., the input device 100 of FIG. 1) may further include a memory (e.g., the memory 160 of FIG. 4) that stores a correction value for all sensing nodes on the touch pad (e.g., the touch pad 110 of FIG. 1), wherein the correction value corresponds to an angle between the reference direction and the first direction, and the processor (e.g., the processor 170 of FIG. 4) may correct, when a touch coordinate value on the touch pad according to the touch input is detected, the touch coordinate value by using a correction value, and may determine touch coordinate information including the corrected touch coordinate value.

According to certain embodiments, the input device (e.g., the input device 100 of FIG. 1) may further include a memory (e.g., the memory 160 of FIG. 4) that stores a touch coordinate value for all sensing nodes on the touch pad (e.g., the touch pad 110 of FIG. 4), which corresponds to an angle between the reference direction and the first direction, and the processor may replace, when a touch coordinate value on the touch pad according to the touch input is detected, the touch coordinate value with a touch coordinate value, and may determine touch coordinate information including the replaced touch coordinate value.

According to certain embodiments, the input device (e.g., the input device 100 of FIG. 1) may further include a wheel key (e.g., the wheel key 101 of FIG. 4) installed on a side surface on the input device, and the processor (e.g., the processor 170 of FIG. 4) may send rotation input information corresponding to a rotation angle and a rotation direction of the wheel key to the external device.

According to certain embodiments described above, an input device (e.g., the input device 100) may include a touch pad (e.g., the touch pad 110 of FIG. 1) that is exposed through a first surface of the input device, a sensor circuit (e.g., the sensor circuit 120 of FIG. 1) that senses a first direction of the outside of the input device, a communication circuit (e.g., the communication circuit 150 of FIG. 4) that communicates with an external device, and a processor (e.g., the processor 170 of FIG. 4). The processor may detect a touch input by using the touch pad, may detect the first direction by using the sensor circuit, may determine touch coordinate information according to the touch input based on an angle between a reference direction on the touch pad and the first direction, and may send the touch coordinate information to the external device through the communication circuit.

According to certain embodiments, the input device (e.g., the input device 100 of FIG. 1) may further include a memory (e.g., the memory 160 of FIG. 4), and the processor (e.g., the processor 170 of FIG. 4) may check a first angle between a reference direction on the touch pad (e.g., the touch pad 110 of FIG. 1) and a third direction in a state where the reference direction and a second direction of a display included in the external device are matched, may store the checked first angle in the memory, may check, when an angle between the reference direction and the third direction changes, a second angle between the reference direction and the third direction changed, and may determine a touch coordinate value according to the touch input based on an angle difference between the first angle and the second angle.

According to certain embodiments, the memory (e.g., the memory 160 of FIG. 4) may store a correction value for all sensing nodes on the touch pad (e.g., the touch pad 110 of FIG. 1), which corresponds to the angle difference, and the processor (e.g., the processor 170 of FIG. 4) may correct, when a touch coordinate value on the touch pad according to the touch input is detected, the touch coordinate value by using a correction value corresponding to the angle difference, and may determine touch coordinate information including the corrected touch coordinate value.

According to certain embodiments, the memory (e.g., the memory 160 of FIG. 4) may store a touch coordinate value for all sensing nodes on the touch pad (e.g., the touch pad 110 of FIG. 1), which corresponds to the angle difference, and the processor (e.g., the processor 170 of FIG. 4) may replace, when a touch coordinate value on the touch pad according to the touch input is detected, the touch coordinate value by using a touch coordinate value corresponding to the angle difference, and may determine touch coordinate information including the replaced touch coordinate value.

According to certain embodiments, the processor (e.g., the processor of FIG. 4) may send, to the external device, the touch coordinate information including a touch coordinate value according to a coordinate system of the touch pad (e.g., the touch pad 110 of FIG. 1) and information of the first direction.

According to certain embodiments, the input device (e.g., the input device 100 of FIG. 1) may further include a wheel key (e.g., the wheel key 101 of FIG. 4) installed on a side surface on the input device, and the processor (e.g., the processor 170 of FIG. 4) may send rotation input information corresponding to a rotation angle and a rotation direction of the wheel key to the external device.

According to certain embodiments described above, an electronic device (e.g., the electronic device 1501 of FIG. 15) may include a communication circuit (e.g., the communication circuit 150 of FIG. 4) that communicates with an input device (e.g., the input device 100 of FIG. 1), a display, and a processor (e.g., the processor 170 of FIG. 4) connected to the display and the communication circuit. The processor may display a pointer object by using the display, may receive touch coordinate information of a touch pad (e.g., the touch pad 110 of FIG. 1) included in the input device and movement-related information of the input device from the input device through the communication circuit, may check an angle between a reference direction on the touch pad and a first direction of the display when that a movement of the input device meets a specified condition is checked based on the movement-related information, may correct the received touch coordinate information based on the checked angle, and may move the pointer object based on the corrected touch input information.

According to certain embodiments, the movement-related information may include at least one sensing information of acceleration information or angular velocity information of the input device (e.g., the input device 100 of FIG. 1), and the processor (e.g., the processor 170 of FIG. 4) may when sensing information indicates that a magnitude of movement of the input device is greater than or equal to a specified magnitude, prompt a user through the display to enter an input indicating a reference direction, may determine the first direction based on a plurality of first touch inputs received from the input device, and may check the angle based on the first direction and the reference direction.

According to certain embodiments, the processor (e.g., the processor 170 of FIG. 4) may prompt the user through the display to enter an input indicating a second reference direction, may determine a second direction based on a plurality of second touch inputs received from the input device (e.g., the input device 100 of FIG. 1), and may check the angle based on the first direction and the second direction.

According to certain embodiments, the electronic device (e.g., the electronic device 1501 of FIG. 15) may further include a memory (e.g., the memory 160 of FIG. 4) that stores a correction value of touch coordinates for all sensing nodes on the touch pad, which corresponds to the checked angle, and the processor (e.g., the processor 170 of FIG. 4) may correct, when a touch coordinate value on the touch pad according to the touch input is detected, the touch coordinate value by using a correction value corresponding to the angle, and may move the pointer object based on the corrected touch coordinate value.

According to certain embodiments, the movement-related information may include information about a third direction of the outside of the input device (e.g., the input device 100 of FIG. 1), and the processor (e.g., the processor 170 of FIG. 4) may check a first angle between the reference direction and the third direction in a state where a reference direction on the touch pad (e.g., the touch pad 110 of FIG. 1) and the first direction are matched, may check, when an angle between the reference direction and the third direction changes, a second angle between the reference direction and the third direction changed, and may correct the touch coordinate information based on an angle difference between the first angle and the second angle.

According to certain embodiments, the electronic device (e.g., the electronic device 1501 of FIG. 15) may further include a memory (e.g., the memory 160 of FIG. 4) that stores a correction value of a touch coordinate value for all sensing nodes on the touch pad (e.g., the touch pad 110 of FIG. 1), which corresponds to the angle difference, and the processor (e.g., the processor 170 of FIG. 4) may correct a touch coordinate value detected from the touch coordinate information by using a correction value corresponding to the angle difference.

According to certain embodiments, the processor (e.g., the processor 170 of FIG. 4) may receive rotation input information corresponding to a rotation angle and a rotation direction of a wheel key (e.g., the wheel key 101 of FIG. 4) included in the input device (e.g., the input device 100 of FIG. 1) from the input device, and may control a function of a running application based on the rotation input information.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An input device comprising:
   a touch pad exposed through a first surface of the input device;
   a sensor circuit configured to sense a movement of the input device;
   a communication circuit configured to communicate with an external device; and
   a processor connected to the touch pad, the sensor circuit and the communication circuit, wherein the processor is configured to:
      when the sensor circuit detects movement of the input device satisfies a specified condition, prompt a user to enter predetermined inputs indicating a reference direction, receive actual user inputs indicating a first direction, and determine the first direction based on the actual user inputs;
      when a touch input on the touch pad is detected by using the touch pad, determine touch coordinate information for the touch input based on an angle between the reference direction on the touch pad and the first direction; and
      send the touch coordinate information to the external device through the communication circuit.

2. The input device of claim 1, wherein the sensor circuit includes at least one of a gyro sensor, an acceleration sensor, or a proximity sensor exposed through a second surface facing away from the first surface, and
   wherein the specified condition is that the movement of the input device has a magnitude is greater than or equal to a specified magnitude.

3. The input device of claim 1, wherein the sensor circuit includes a grip sensor disposed on at least a portion of a side surface of the input device,
   wherein the processor is configured to:
      detect a finger of a user gripping the input device by using the grip sensor;
      check the movement of the input device based on a position of the finger; and
      determine that the movement meets the specified condition when the position of the finger changes by at least a specified distance.

4. The input device of claim 1, wherein:
   prompting the user to enter the predetermined touch inputs comprises prompting the user to provide an input facing the first direction using an output device; and
   wherein the actual user inputs comprise a plurality of touch inputs on the touch pad.

5. The input device of claim 1, further comprising:
   a memory configured to store a correction value for all sensing nodes on the touch pad, wherein the correction values corresponds to an angle between the reference direction and the first direction,
   wherein the processor is configured to:
      when a touch coordinate value on the touch pad according to the touch input is detected, correct the touch coordinate value by using the correction value; and
      determine touch coordinate information including the corrected touch coordinate value.

6. The input device of claim 1, further comprising:
   a memory configured to store a touch coordinate value for all sensing nodes on the touch pad, which corresponds to an angle between the reference direction and the first direction,
   wherein the processor is configured to:
      when a touch coordinate value on the touch pad according to the touch input is detected, replace the touch coordinate value with a touch coordinate value; and
      determine touch coordinate information including the replaced touch coordinate value.

7. The input device of claim 1, further comprising:
   a wheel key installed on a side surface on the input device,
   wherein the processor is configured to:
      send rotation input information corresponding to a rotation angle and a rotation direction of the wheel key to the external device.

8. An electronic device comprising:
   a communication circuit configured to communicate with an input device;
   a display; and
   a processor connected to the display and the communication circuit, wherein the processor is configured to:
      display a pointer object by using the display;
      receive touch coordinate information of a touch pad included in the input device from the input device through the communication circuit; and move the pointer object based on the touch coordinate information,
wherein the processor is further configured to:
receive movement-related information of the input device from the input device through the communication circuit;
when that a movement of the input device meets a specified condition is checked based on the movement-related information, display a first guide screen guiding a touch input for a first direction of the display;
receive touch coordinate information for a first touch input corresponding the first guide screen;
check an angle between a reference direction on the touch pad and a first direction of the display based on the touch coordinate information for the first touch input;
correct the received touch coordinate information based on the checked angle; and
move the pointer object based on the corrected touch coordinate information.

9. The electronic device of claim 8, wherein the movement-related information includes at least one sensing information of acceleration information or angular velocity information of the input device, and
wherein the processor is configured to:
when sensing information indicates that a magnitude of the movement of the input device is greater than or equal to a specified magnitude, display the first guide screen; and
receive touch coordinate information for a plurality of the first touch input corresponding the first guide screen.

10. The electronic device of claim 8, wherein the processor is configured to:
display a second guide screen guiding a touch input for a second direction of the display;
receive touch coordinate information for a second touch input corresponding the second guide screen; and
check the angle based on the touch coordinate information for the first touch input and the touch coordinate information for the second touch input.

11. The electronic device of claim 8, further comprising:
a memory configured to store a correction value of touch coordinates for all sensing nodes on the touch pad, which corresponds to the checked angle,
wherein the processor is configured to:
when a touch coordinate value on the touch pad according to the touch input is detected, correct the touch coordinate value by using the correction value corresponding to the angle; and
move the pointer object based on the corrected touch coordinate value.

12. The electronic device of claim 8, wherein the movement-related information includes information about a third direction of the outside of the input device, and
wherein the processor is configured to:
check a first angle between a reference direction and the third direction in a state where a reference direction on the touch pad and a first direction are matched;
when an angle between the reference direction and the third direction changes, check a second angle being the changed angle between the reference direction and the third direction; and
correct the touch coordinate information based on an angle difference between the first angle and the second angle.

13. The electronic device of claim 12, further comprising:
a memory configured to store a correction value of a touch coordinate value for all sensing nodes on the touch pad, which corresponds to the angle difference,
wherein the processor is configured to:
correct a touch coordinate value detected from the touch coordinate information by using the correction value corresponding to the angle difference.

14. The electronic device of claim 8, wherein the processor is configured to:
receive rotation input information corresponding to a rotation angle and a rotation direction of a wheel key included in the input device from the input device; and
control a function of a running application based on the rotation input information.

* * * * *